(12) United States Patent
Debert et al.

(10) Patent No.: US 9,174,636 B2
(45) Date of Patent: Nov. 3, 2015

(54) METHOD FOR ENERGY MANAGEMENT IN A HYBRID VEHICLE

(71) Applicant: RENAULT S.A.S., Boulogne-Billancourt (FR)

(72) Inventors: Maxime Debert, Versailles (FR); Franck Breuille-Martin, Intville-la-Guetard (FR); Loic Le-Roy, Le Plessis Robinson (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/406,352

(22) PCT Filed: Jun. 25, 2013

(86) PCT No.: PCT/FR2013/051478
§ 371 (c)(1),
(2) Date: Dec. 8, 2014

(87) PCT Pub. No.: WO2014/001707
PCT Pub. Date: Jan. 3, 2014

(65) Prior Publication Data
US 2015/0149011 A1 May 28, 2015

(30) Foreign Application Priority Data

Jun. 27, 2012 (FR) ...................................... 12 56087

(51) Int. Cl.
*B60L 9/00* (2006.01)
*B60L 11/00* (2006.01)
(Continued)

(52) U.S. Cl.
CPC ............. *B60W 20/108* (2013.01); *B60W 10/06* (2013.01); *B60W 10/08* (2013.01); *B60W 10/26* (2013.01);
(Continued)

(58) Field of Classification Search
USPC ............. 701/22, 102; 320/130, 150; 180/265, 180/65.21; 903/930, 903
See application file for complete search history.

(56) References Cited

U.S. PATENT DOCUMENTS 6,166,449 A * 12/2000 Takaoka et al. ............. 290/40 B
6,486,637 B1 * 11/2002 Nakanishi et al. ............ 320/150
(Continued)

FOREIGN PATENT DOCUMENTS

EP 0829389 A2 3/1998
EP 1842758 A1 10/2007
(Continued)

OTHER PUBLICATIONS

Battery charge-discharge control strategy based on the single Z-source three-level SVPWM inverter; Ke Qing Qu; Qing Quan Niu; Chong Yang; Jin Bin Zhao; Applied Superconductivity and Electromagnetic Devices (ASEMD), 2013 IEEE International Conference on; Year: 2013; pp. 30-33, DOI: 10.1109/ASEMD.2013.6780701.*
(Continued)

*Primary Examiner* — Cuong H Nguyen
(74) *Attorney, Agent, or Firm* — Oblon, McClelland, Maier & Neustadt, L.L.P.

(57) ABSTRACT

A method for managing energy in response to a request of a driver for torque on a power train of a hybrid vehicle including a heat engine and at least one electric motor powered by a battery, capable of recovering energy during deceleration in accordance with a management rule distributing the energy supply from the heat engine and from the electric motor in real time. The energy-management law depends on: an equivalence factor that is based on an instantaneous energy state of the battery, an energy target, and travel conditions of the vehicle; and a discharge precompensation factor that is based on energy potential that can be recovered during deceleration.

9 Claims, 1 Drawing Sheet

(51) Int. Cl.
*B60W 20/00* (2006.01)
*B60W 10/06* (2006.01)
*B60W 10/08* (2006.01)
*B60W 10/26* (2006.01)

(52) U.S. Cl.
CPC .......... *B60W 20/00* (2013.01); *B60W 20/1062* (2013.01); *B60W 2510/244* (2013.01); *B60W 2520/10* (2013.01); *B60W 2530/10* (2013.01); *B60W 2540/10* (2013.01); *B60W 2550/13* (2013.01); *B60W 2710/244* (2013.01); *Y10S 903/93* (2013.01)

(56) References Cited

U.S. PATENT DOCUMENTS

| | | | |
|---|---|---|---|
| 7,583,053 B2* | 9/2009 | Kamohara | 320/106 |
| 2005/0228553 A1* | 10/2005 | Tryon | 701/22 |
| 2007/0118255 A1* | 5/2007 | Wakashiro et al. | 701/22 |
| 2007/0294026 A1 | 12/2007 | Schirmer | |
| 2009/0058366 A1* | 3/2009 | Masuda | 320/135 |
| 2009/0259354 A1* | 10/2009 | Krupadanam et al. | 701/22 |
| 2010/0051366 A1* | 3/2010 | Junca et al. | 180/65.265 |
| 2010/0094494 A1* | 4/2010 | Jerwick | 701/22 |
| 2010/0156356 A1* | 6/2010 | Asakura et al. | 320/148 |
| 2011/0066308 A1 | 3/2011 | Yang et al. | |
| 2011/0166731 A1* | 7/2011 | Kristinsson et al. | 701/22 |
| 2012/0232730 A1* | 9/2012 | Sujan et al. | 701/22 |
| 2012/0232731 A1* | 9/2012 | Sujan et al. | 701/22 |

FOREIGN PATENT DOCUMENTS

| | | |
|---|---|---|
| EP | 2131440 A1 * | 12/2009 |
| FR | 2926048 A1 | 7/2009 |
| WO | PCT/FR07/52089 * | 10/2007 |
| WO | 2012005655 A1 | 1/2012 |

OTHER PUBLICATIONS

On-line state of charge estimation of lithium-ion power battery pack using optimized unscented Kalman filtering; Guo Xiangwei; Kang Longyun; Huang ; Guo Xiangwei; Kang Longyun; Huang Zhizhen; Transportation Electrification Asia-Pacific (ITEC Asia-Pacific), 2014 IEEE Conference and Expo; Year: 2014; pp. 1-6, DOI: 10.1109/ITEC-AP.2014.6941125.*

Estimating the rate of battery degradation under a stationary Markov operating policy; Donadee, J.; Ilic, M.; PES General Meeting | Conference & Exposition, 2014 IEEE; Year: 2014; pp. 1-5, DOI: 10.1109/PESGM.2014.6939034.*

Analysis of a building power system with a rooftop PV array and phevs as an aggregator; Young-Jin Kim; Kirtley, J.L.; Norford, L.K. Innovative Smart Grid Technologies (ISGT), 2013 IEEE PES; Year: 2013; pp. 1-6, DOI: 10.1109/ISGT.2013.6497784.*

International Search Report issued Oct. 31, 2013 in PCT/FR2013/051478 filed Jun. 25, 2013.

French Search Report issued Apr. 18, 2013 in French Application 1256087 filed Jun. 27, 2012.

* cited by examiner

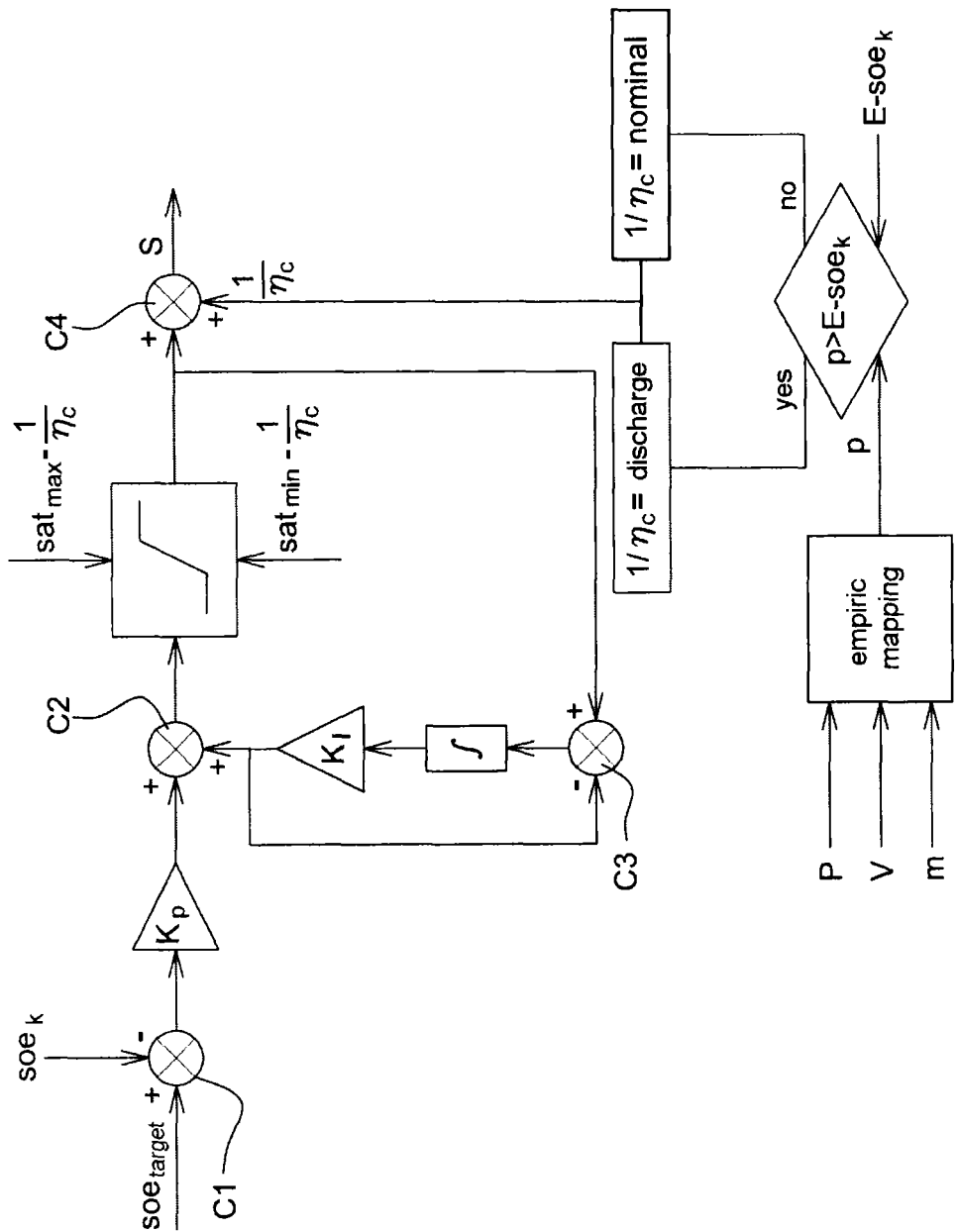

METHOD FOR ENERGY MANAGEMENT IN A HYBRID VEHICLE

The present invention concerns the management of the distribution of energy flows in a hybrid propulsion unit of a motor vehicle in response to the driver's request for torque.

More precisely, its object is a method for managing energy from a propulsion unit of a hybrid vehicle comprising an internal combustion engine and at least one electric motor powered by a battery, able to recover energy during deceleration, following a management law distributing in real time the energy supply from the internal combustion engine and from the electric motor.

A propulsion unit of a hybrid motor vehicle with front- or rear-wheel drive comprises an internal combustion engine and one or more electrical machines powered by at least one battery mounted on-board the vehicle.

Control systems for hybrid propulsion units are designed to manage the operation and synchronization of the different motors as a function of the driving conditions, in order to limit fuel consumption and minimize the emission of pollutants. We call this the management of thermal and electrical energy flows, designating in particular the control strategy applied in the control system in order to optimize the distribution of power between the energy supply from the internal combustion engine and that from the electric motor. The principle used to select the best operating point consists of minimizing the sum of the thermal energy consumption and the electricity consumption, following a management law distributing in real time the energy from the internal combustion engine and that from the electric motor.

The energy management laws for a hybrid vehicle naturally tend to use the energy contained in the battery, in particular at high speed. Also, the batteries are able to recover energy during deceleration. However on certain significant and/or extended descents, for example on mountain passes, the energy level in the battery may exceed the recoverable energy level. During deceleration and/or braking, it is not then possible to recover in the battery all the kinetic and potential energy of the vehicle. As well as energy considerations, this situation modifies the behavior of the vehicle during the deceleration phase and reduces the ease of driving.

Publication FR 2 926 048 discloses a method for controlling the accelerations of a hybrid vehicle with the aim of improving the ease of driving by ensuring that the driver has powerful acceleration under all circumstances, by a supply of electrical energy taking into account not only the state of charge of the battery but also the quantity of the electrical energy recoverable during deceleration.

The method therefore has the merit of utilizing the potential electrical energy of braking in order to improve the response of the vehicle in acceleration. However it has no effect on the behavior and energy management of the vehicle in real braking or deceleration situations.

The present invention aims to optimize the potential for energy recovery during braking and deceleration of a hybrid vehicle, while promoting a reduction in fuel consumption and a homogenous behavior of the vehicle during the deceleration phases.

To this end, it proposes that the energy management law depends:
- on an equivalence factor which is a function of the momentary energy state of the battery, an energy target and the driving conditions of the vehicle, and
- on a discharge factor which is a function of the potential energy recoverable during deceleration.

Preferably, the discharge factor is taken into account in the energy management law as soon as the potential energy recoverable during deceleration exceeds the absorption capacity of the battery.

According to a non-limitative embodiment of the invention, the equivalence factor is determined in a regulation loop, able to minimize the global energy consumption of the vehicle at an operating point of the propulsion unit.

Other characteristics and advantages of the present invention will arise clearly from reading the following description of a non-limitative embodiment thereof, and with reference to the attached drawing, the single FIGURE of which explains the principle.

The energy management law of a hybrid vehicle divides the torque request from the driver between the electrical machine(s) in real time in order to minimize the global fuel consumption. It is based on the minimizing of a function of the type below, for weighting the energy from the electric motor in the energy management law by a factor s:

$$H\_eq = \text{thermal\_consumption} + s * \text{electrical\_consumption},$$

where
- the thermal consumption is a function of the torque and speed of the internal combustion engine,
- the electrical consumption is a function of the torque and speed of the electrical machine, and
- s is an equivalence factor translating the energy equivalence between thermal power and electrical power.

In the non-limitative example of the calculation loop for the equivalence factor s illustrated by the FIGURE, a first comparator C1 receives as input values the energy state $soe_k$ of the battery at instant k, and a target value for the energy state $soe_{target}$. The difference $(soe_{target} - soe_k)$ is multiplied by a correction factor $K_p$. A second comparator C2 produces the sum of the result $[K_p(soe_{target} - soe_k)]$ and an integral correction term, which ensures a correction of the equivalence factor as a function of the driving conditions encountered. This sum is saturated by the saturator S which ensures that the equivalence factor remains within the controlled limits. The minimum $(sat_{min} - 1/\eta c)$ and maximum $(sat_{max} - 1/\eta c)$ saturation limits ensure control of the forced recharge and discharge modes.

The maximum saturation $sat_{max}$ is the maximum equivalence value controlling the propulsion unit which recharges the battery energy to the maximum. The saturation $sat_{min}$ is the minimum equivalence value controlling the propulsion unit which discharges the battery to the maximum. The integrator I integrates the difference between the output from the saturator S and its own integration, multiplied by a correction factor $k_i$ using comparator C3. By integrating this difference, the integrator cannot race when the system is saturated. This method is known under the English name of "anti-windup". A term $1/\eta c$ of the feed-forward type is added to the saturator output using comparator C4. This feed-forward term allows direct adaptation of the equivalence factor as a function of a recognized and/or predicted driving situation.

This loop comprises a loop integrator of a term representative of the difference between the momentary state of the battery energy and the target energy state of the battery associated with an anti-windup device. It also comprises a proportional compensation term.

The loop also has a feed-forward term. The equivalence factor is controlled discretely following the equation below:

$$S_{k+1} = 1/\eta c + K_p(soe_{target} - soe_{k+1}) + K_p K_I(soe_{target} - soe_k)$$

In this equation, $soe_{target}$ is the target energy state to be attained, and $soe_k$ is the energy state of the battery at instant k.

$K_P$ and $K_I$ are respectively the proportional and integral correction gains; $\eta_c$ is the mean efficiency of conversion of electrical energy into thermal energy. The mean efficiency of conversion $\eta_c$ can therefore be calculated to adapt permanently to circumstances from a priori knowledge of predictable driving conditions, or from analysis of the preceding driving conditions. The integral correction applies an a posteriori correction of the energy equivalence hypotheses.

If for example a driving condition of the "congestion" type is identified, it is possible to give the conversion efficiency $\eta_c$ a value adapted to congestion, and obtain an equivalence factor substantially different from the equivalence for motorway driving.

Finally, when the equivalence is saturated i.e. the equivalence factor s reaches limit values, imposing recharge or discharge on the battery at any cost, the equivalence factor s does not exceed the acceptable (lower and upper) limits because the anti-windup function prevents any sudden racing of the integral term.

At the output from this loop, the equivalence factor s is corrected in the comparator C4 by addition of a feed-forward term which forces discharge when the energy recovery potential p is greater than the total energy E which the battery can absorb, minus the energy level $soe_k$ measured in the battery at the instant concerned.

The recoverable energy potential p is defined empirically, preferably by measuring the quantity of energy recovered in the battery following various decelerations on different gradients until stoppage. It is also a function of an estimation of the speed V of the vehicle, an estimation of the gradient P of the road, and an estimation of the mass m of the vehicle. Maps can be produced which give the recoverable energy p as a function of the speed V and gradient P of the road for different vehicle masses m.

The recoverable energy potential p is compared in the comparator C5 to the difference $E-soe_k$ between the maximum energy level of the battery and its momentary energy state $soe_k$.

As soon as the potential energy recoverable during deceleration p exceeds the absorption capacity $E-soe_k$ of the battery, the feed-forward term is set to a value which forces discharge, which is taken into account in the energy management law by addition to an equivalence factor s in the comparator C4, which gives the final equivalence factor $e_{fin}$ determining the energy management law. The discharge factor is cancelled when the state of charge of the battery ($soe_k$) is sufficiently low in relation to the potential energy recoverable (p).

In conclusion, the introduction of the discharge feed-forward factor in the energy management law allows optimization of the potential energy recoverable during braking on a hybrid vehicle. It prevents the energy recovered during deceleration from exceeding the battery absorption capacity, by further utilizing electrical energy in these circumstances. The invention therefore guarantees a reduction in fuel consumption of the vehicle, and minimizes the dissipation of energy into the mechanical brakes. These arrangements are particularly advantageous on vehicles fitted with transmission without gear variation, and/or with braking distribution between the mechanical brakes and the electrical machine.

The invention claimed is:

1. A method for managing energy from a propulsion unit in response to a request for torque by a driver of a hybrid vehicle including an internal combustion engine and at least one electric motor powered by a battery, able to recover energy during deceleration, following a management law distributing in real time an energy supply from the internal combustion engine and from the electric motor, wherein the energy management law depends:
   on an equivalence factor which is a function of a momentary energy state of the battery, an energy target, and driving conditions of the vehicle determined in a regulation loop, able to minimize global energy consumption of the vehicle at an operating point of the propulsion unit; and
   on a discharge feed-forward factor which is a function of potential energy recoverable during deceleration.

2. The method as claimed in claim 1, wherein the discharge factor is taken into account in the energy management law as soon as the potential energy recoverable during deceleration exceeds an absorption capacity of the battery.

3. The control method as claimed in claim 1, wherein the discharge factor is added to an equivalence factor in a comparator.

4. The control method as claimed in claim 3, wherein the discharge factor is added to the equivalence factor at an output from the regulation loop.

5. The control method as claimed in claim 1, wherein the recoverable energy potential is defined empirically by measuring a quantity of energy recovered in the battery during decelerations on different gradients until stoppage.

6. The control method as claimed in claim 5, wherein the recoverable energy potential is defined as a function of an estimation of a gradient of a road.

7. The control method as claimed in claim 5, wherein the recoverable energy potential is a function of mass of the vehicle.

8. The control method as claimed in claim 5, wherein the recoverable energy potential is a function of speed of the vehicle.

9. The control method as claimed in claim 1, wherein the discharge factor is cancelled when a state of charge of the battery is sufficiently low in relation to the recoverable energy potential.

* * * * *